Patented Sept. 9, 1952

2,609,931

UNITED STATES PATENT OFFICE 2,609,931

METHOD OF FILTERING

Clarke A. Rodman, Garden City, N. Y., and Norman L. Tewksbury, Fall River, Mass., assignors to Fram Corporation, a corporation of Rhode Island No Drawing. Application April 17, 1948, Serial No. 21,764

5 Claims. (Cl. 210—62)

This invention relates to filtration, and particularly to the filtration of hydrocarbon oils such as are used either for lubrication or fuel in internal combustion engines, and particularly to the removal of solids and colloids therefrom.

In the use of lubricating or fuel hydrocarbon oil for internal combustion engines, either of the gasoline or diesel types, minute solids occur in the oil due to pyrolytic or oxidation decomposition and are removed by use of some filtering media such as cloth, paper, fibers of various characters such as cotton, rayon, wool, or wood pulp, requiring considerable time to remove such solid particles. Various types of such filters, referred to as the depth type or the type in which considerable surface area is involved, are utilized.

One of the objects of this invention is to increase sharply the removal of the above mentioned foreign solids and colloids from the oil and collect or adsorb the same upon the filtering media.

Another object of this invention is to effect such sharp increase of removal by means of treatment of filtering media or the oil to be filtered just prior to its passage through the filtering media so as to more efficiently and more quickly attract or accumulate the solid and colloidal particles in the oil on the filtering media.

A more specific object of this invention is to treat the filtering media with a chemical substance which will have an attraction for the solid and colloidal particles to more effectively accumulate them in the filtering media.

It has been found that some of the organic sludge particles formed in the use of the oil have anion activity, especially when dispersed in the oil. Many of these sludge particles have a large number of carboxyl, aldehyde, hydroxyl endings, ketone groupings and polyhydric alcohol groupings, which account for this anion activity. Accordingly, we have found that by treating the filtering media, or the oil which is about to be passed through the filtering media, with some material which is highly cation active, that an attraction is set up which causes the sludge particles which are anion active to be more quickly accumulated upon the filtering media.

It is considered that certain foreign solids or colloids in the oil may have a cation activity. Accordingly, we have found that by treating the filtering media with some material which is highly anion active, that an attraction had been set up which caused the sludge particles or foreign solids and colloids to be more quickly accumulated upon the filtering media. This type of treatment did not accomplish as rapid a removal of the foreign solids and colloids as did the cation active treatments.

It is known that, due to a potential difference, a weak cation active material would be attracted to or picked up on a strong cation active material. Also, it is known that an anion active material would be attracted to or picked up on a cation active material. The converse would be true for these two phenomena in the case of an anion system.

This matter of attraction may be either because of the ionic attraction between the cation and anion groups as a whole, or may be on the basis of polar adsorption, wherein there is an orientation of the molecules whose field of force diminishes as the distance increases from the maximum adsorption layer or this attraction may be of the molecular type wherein the surface of the chemical has an affinity for the surface of the oil decomposition particles and hence an attraction may occur. The ionic attraction and polar adsorption attraction are close in theory and may well be illustrated by the following cation active group of materials having an amine ending such as products formed by the reaction at an elevated temperature of ⅓ mole of a glyceride of oleic acid type of which cottonseed and corn oils are examples, with 1 mole commercial diethylene triamine. The reaction is a function of temperature and the time that the material is subjected to such temperature. Thus the higher the temperature, the faster the reaction up to a temperature at which the organic components will decompose, it being understood that the temperature must remain below the point at which such organic components decompose. The reaction is completed when there is no further decrease in alkalinity. The principal product is considered to be the oleic acid mono amide of diethylene triamine

Products formed by the reaction of the above material with 2 moles of ethylene oxide may also be used as an illustration. The principal product is considered to be the oleic acid mono amide of diethylene triamine diethylene glycol

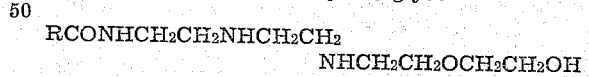

Another example is illustrated wherein ⅔ mole of a glyceride of oleic acid is used in place of the ⅓ mole. The condensation product with diethylene triamine would be

RCONHCH₂CH₂NHCH₂CH₂NHOCR

The second reaction with ethylene oxide would produce the product:

RCONHCH₂CH₂NCH₂CH₂NHOCR
        |
    CH₂CH₂OCH₂CH₂OH

Other very good results have been obtained from products formed by the reaction of ⅓ mole sperm oil and 1 mole of diethylene triamine which products were then reacted with 2 moles of ethylene oxide. In each of the above cases, amine endings are present. Other materials which may be utilized are the fatty acid amines, which are as follows: dioleic amide of diethylene triamine, lauric mono amide diethylene triamine, ricinoleic mono amide diethylene triamine; or the reaction of ethylene oxide with any of the above. The ethylene oxide reaction may be either an addition on the end amine group or if carried further additions would occur progressively on the next to the end amine group or the group second from the end.

It is felt that the above amines or amine amides have two cation reactive groups, one a strong NH group and one weak NH₂ group. In the case of the polar adsorption theory, the groups may be either primary as an NH₂ group, secondary as an NH group.

Polar adsorption is another consideration of contaminant pick up other than the ionic attraction or pick-up described above. Such an adsorption causes an orientation of molecules whose field of force diminishes as the distance increases from the initial adsorption layer. This theory accounts for the possibility of a porous filter cake forming on the outer surface of the filter media. Consider the adsorption of a fatty acid on a water surface. The carboxyl polar group penetrates the water interface, and the fatty acid radical extends vertically above the water surface. We find that the second molecule of fatty acid is adsorbed with the radical attracted to the radical of the first molecular film. In the third molecular film, the polar groups attract each other, etc. This orientation caused by the field of force set up by the first adsorption of the carboxyl group in the water continues until the diminishing field of force has little or no effect on succeeding molecules.

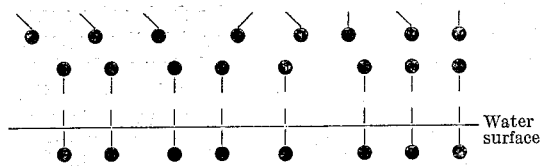

● is a carboxyl group, and
— is the fatty acid radical chain.

In a filter system with carboxyl groups on the filter media's surface and sludge particles with carboxyl endings, we would expect from the above theory an adsorption build-up on the filter media as follows:

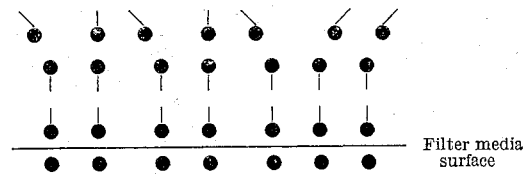

An OH or CHO rather than the full COOH ending could cause a similar effect. Any of the amines could be considered polar endings and polar adsorption similar to that described above could occur. We do not know all the polar endings existent in lube oil sludge. It is very possible that polar endings akin to the amine groups might exist and that polar adsorption as well as electrophoresis or ionic attraction could very well exist together.

It would seem in theory that the surfaces of I

RCONHCH₂CH₂NHCH₂CH₂NH₂ or II

RCONHCH₂CH₂NHCH₂CH₂
                NHCH₂CH₂OCH₂CH₂OH would tend to attract oil contaminants, some of which are (1) High molecular aliphatic aldehydes, which have

endings (2) High molecular aliphatic ketones, which have

groupings (3) High molecular aliphatic alcohols, which have —CH₂OH endings
(4) High molecular unsaturate chain hydrocarbon resin isomers and polymers, which have CH=CH groupings
(5) High molecular fatty acids which have —COOH endings
(6) High molecular polyhydric ethers having —CH₂OCH₂— groupings
(7) High molecular carbonaceous material— mostly carbon

groupings.

It is assumed that the

—NHCH₂CH₂NHCH₂CH₂NH₂ or

—NHCH₂CH₂NHCH₂CH₂
            NHCH₂CH₂OCH₂CH₂OH groupings attract the

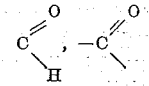

CH₂OH and —CH₂OCH₂— groupings of the contaminants, there is also a possibility for the resinous matter to polymerize with or condense on ethylene group chains. The contaminant fatty acids having COOH endings probably adsorb on —NHCH₂CH₂NHCH₂CH₂NH₂— or

— NHCH₂CH₂NHCH₂CH₂NHCH₂CH₂OCH₂CH₂OH but would tend more to adsorb on the R radical. It is felt that the oil molecule carrying contaminant molecules with it would wet on the fatty acid chain R which is similar in structure with the oil molecule and that the contaminant molecules adhere to the poly ethylene chain. The next oil molecule and contaminant molecules adhere on the surface of the first; hence, a contaminant bed is built upon a cellulose chain if it contains a film surface of I or II; or a molecule of I or II in the oil will adsorb a sufficient quantity of contaminant to be picked up by the filter media, chemical and contaminant together, as it comes in contact with the filter media.

This attraction might fall in three theoretical types of attraction:

(1) Ionic
    (2) Polar
    (3) Molecular which have been described above.

The general classification of the principal products of this group of materials which tend to produce this attraction phenomena might be listed as follows:

(1) the mono fatty acid amide of an alkylene or polyalkylene polyamine $$RCONH(R_1NH)_nR_1NH_2$$

where

RCO is a fatty acid radical, oleic, stearic, ricinoleic and sperm oil are examples
$R_1$ is an alkylene group, ethylene, butylene are examples
$n$ is 0 or any whole number (2) the di fatty acid amide of a polyalkylene amine $$RCONH(R_1NH)_nR_1NHOCR$$

where

RCO is a fatty acid radical, oleic, stearic, ricinoleic and sperm oil are types
$R_1$ is an alkylene group
$n$ is 0 or any whole number (3) the mono fatty acid amide of an alkylene or polyalkylene polyamine reacted with an alkylene or olefin oxide, ethylene oxide, butylene oxide are examples:

$$RCONH(R_1NH)_nR_1NH(R_2O)R_2OH$$

or

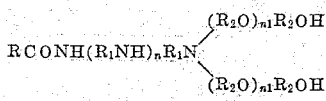

where

RCO is a fatty acid radical
$R_1$ is an alkylene group
$R_2$ is an alkylene group the same as or different from $R_1$
$n$ is 0 or any whole number
$n_1$ is 0 or any whole number the same as or different from $n$ (4) the di fatty acid amide of an alkylene or polyalkylene polyamine reacted with an alkylene or olefin oxide:

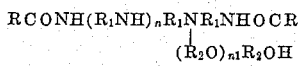

or

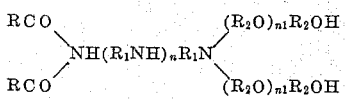

where

RCO is a fatty acid radical, oleic, stearic, ricinoleic and sperm oil are examples
$R_1$ is an alkylene or olefin group, ethylene, butylene are examples
$R_2$ is an alkylene group the same as or different from $R_1$
$n$ is 0 or any whole number
$n_1$ is 0 or any whole number the same as or different from $n$ Specific examples of this classification would be:
(1) the mono fatty acid amide of diethylene triamine $$RCONHCH_2CH_2NHCH_2CH_2NH_2$$

where RCO is a fatty acid radical
(2) the difatty acid amide of diethylene triamine $$RCONHCH_2CH_2NHCH_2CH_2NHOCR$$

where RCO is a fatty acid radical.
(3) the mono fatty acid amide of diethylene triamine reacted with 2 moles of ethylene oxide:

$$RCONHCH_2CH_2NHCH_2CH_2NHCH_2CH_2OCH_2CH_2OH$$

or

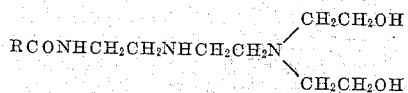

where RCO is a fatty acid radical, oleic, stearic, ricinoleic and sperm oil are types.
(4) the difatty acid amide of diethylene triamine reacted with 2 moles of ethylene oxide:

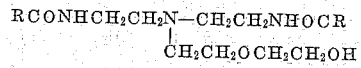

where RCO is a fatty acid radical, oleic, stearic, ricinoleic and sperm oil are types.

These materials thus produced are used for treating filtering materials such as paper or fibers such as natural or synthetic fibers, by immersing the filter material in the above mentioned products while heated to a temperature ranging between 120° to 150° F. In some cases the material is denatured with alcohol or isopropanol solution, in which there are 2–25 parts of the above materials and 98–75 parts of alcohol. In some cases, additions of the above solution to a paper beater, paper pulp, or paper may be utilized. Thread waste or fiber blends may be likewise treated by immersion in the above solution. These materials may be converted to other forms to facilitate their application to a specific filter medium, for example, the conversion of the compound to an acetate salt for using in water emulsion or solution treatments.

In some cases instead of treating the filter media as above indicated, ionic or other non-ionic materials may be placed in the oil to be filtered just prior to its passage through the filter media and advantageous results will be found to be performed.

From our experimentation on the aforementioned chemical compounds used as treatments for filter medias, the following example is cited:

Example A.—A filter cartridge whose filtering surface consisted of paper was immersed in a solution of one of the diethylene amine fatty acid amides, namely the compound containing as its chief component the mono oleic amide of diethylene triamine, mentioned above consisting of 12.5 parts by weight of the compound and 82.5 parts by weight of isopropanol. The cartridge which was then installed in a suitable test unit was then subjected to a recirculation lubricating oil test, to which oil a given given amount of natural sludge was added at a specified rate. An index classification system has been established whose unit 1 is equivalent to the oil contamination with no filter cartridge in the circulation system. The cartridge treated with this diethylene amine ester has an index for this particular test of 10, while an untreated cartridge tested under similar conditions has an index of 2. The higher the index, the better the filter performance.

From experimental data, the following treated papers are indexed comparatively as follows:

| Paper Treated with a Compound Containing— | Index |
|---|---|
| (1) No treatment | 2 |
| (2) Example A: the mono oleic amide of diethylene triamine | 10 |
| (3) the mono lauric amide of diethylene triamine | 6 |
| (4) the mono ricinoleic amide of diethylene triamine | 7 |
| (5) the di oleic amide of diethylene triamine | 5 |
| (6) the mono stearic amide of diethylene triamine | 5 |
| (7) the mono sperm oil amide of diethylene triamine diethylene glycol | 8 |
| (8) the mono oleic amide of diethylene triamine diethylene glycol | 12 |

We claim:

1. A method of attracting or adsorbing the pyrolytic and oxidation decomposition products of a hydrocarbon oil forming a contaminant in said oil for removing said contaminant from said oil, which method comprises collecting on a filter media, contaminant from the oil which has been contacted with a composition containing as the essential ingredient at least one compound from the group consisting of the following compounds whose generic formulae are:

$$RCONH(R_1NH)_m R_1NH(R_2O)_n R_2OH$$

$$RCONH(R_1NH)_m R_1N \diagup^{(R_2O)_n R_2OH}_{(R_2O)_n R_2OH}$$

$$RCONH(R_1NH)_m R_1N(R_1NH)_p R_1NHOCR$$
$$\underset{(R_2O)_n R_2OH}{|}$$

where

RCO is fatty acid radical or part of a fatty acid glyceride
$R_1$ is an alkylene group
$R_2$ is an alkylene group the same as or different from $R_1$
$m$ is 0 or any whole number
$n$ is 0 or any whole number the same as or different from $n$
$p$ is 0 or any whole number the same as or different from $m$ or $n$, the compound being prepared by reacting an alkylene oxide and the products formed by reacting a polyalkylene polyamine and a material selected from the group consisting of fatty acids and fatty acid glycerides at an elevated temperature and for a length of time until there is no longer a decrease of alkalinity.

2. A method according to claim 1 wherein there is ⅓ to ⅔ mole of a glyceride of oleic acid type with 1 mole of diethylene triamine, and the alkylene or olefin oxide is 2 to 5 moles of ethylene oxide.

3. A method according to claim 1 wherein there is ⅓ to ⅔ mole of a glyceride of ricinoleic acid type with 1 mole of diethylene triamine, and the alkylene or olefin oxide is 2 to 5 moles of ethylene oxide.

4. A method according to claim 1 wherein there is ⅓ to ⅔ mole of a sperm oil with 1 mole of diethylene triamine, and the alkylene or olefin oxide is 2 to 5 moles of ethylene oxide.

5. The method as set forth in claim 1 wherein the said material for contacting the oil is carried by the media on which the contaminant is collected.

CLARKE A. RODMAN.
NORMAN L. TEWKSBURY.

REFERENCES CITED

The following references are of record in the file of this patent:

UNITED STATES PATENTS

| Number | Name | Date |
|---|---|---|
| 2,252,554 | Carothers | Aug. 12, 1941 |
| 2,343,430 | Wells et al. | Mar. 7, 1942 |
| 2,343,436 | Wells et al. | Mar. 7, 1942 |
| 2,367,384 | Tymstra et al. | Jan. 16, 1945 |
| 2,371,736 | Carson | May 20, 1945 |
| 2,386,867 | Johnson | Oct. 16, 1945 |
| 2,387,201 | Weiner | Oct. 16, 1945 |
| 2,395,400 | Groote | Feb. 16, 1946 |
| 2,419,404 | Johnson | Apr. 22, 1947 |
| 2,425,392 | Robinson | Aug. 12, 1947 |

FOREIGN PATENTS

| Number | Country | Date |
|---|---|---|
| 540,122 | Great Britain | Oct. 6, 1945 |